United States Patent [19]

Selander

[11] 4,090,287

[45] May 23, 1978

[54] WORKPIECE CHANGER MECHANISM FOR A MACHINE TOOL

[75] Inventor: Douglas S. Selander, New Berlin, Wis.

[73] Assignee: Kearney & Trecker Corporation, West Allis, Wis.

[21] Appl. No.: 763,560

[22] Filed: Jan. 28, 1977

[51] Int. Cl.² .......................................... B23Q 3/157
[52] U.S. Cl. ...................................... 29/568; 29/563; 214/1 BB; 214/1 BC; 408/71
[58] Field of Search ...................... 29/568, 33 D, 563; 214/1 BB, 1 BC, 1 BD; 408/71

[56] References Cited

U.S. PATENT DOCUMENTS 3,825,245  7/1974  Osburn et al. .......................... 269/30
3,986,617  10/1976  Blomquist .......................... 214/1 BB Primary Examiner—Othell M. Simpson
Assistant Examiner—Z. R. Bilinsky
Attorney, Agent, or Firm—Cyril M. Hajewski

[57] ABSTRACT

A machine tool has a worktable slidably mounted on a bed for movement along a horizontal X axis opposite a spindle which is journalled for rotation about a horizontal Z axis perpendicular to the X axis, the spindle being slidably mounted on the bed for movement along the Z axis toward and away from the worktable and for movement along a vertical Y axis perpendicular to both the X and Z axes. A workpiece storage support is rotatably mounted on a frame adjacent to the worktable on the side thereof opposite the spindle. The worktable and workpiece storage support have guideways thereon for slidably receiving a pallet carrying a workpiece, the guideways being positioned so that they can be aligned to permit a pallet to be slid from the workpiece storage support to the worktable and vice versa along the Z axis. A pallet transfer bar is provided which is dimensioned on one end to fit in the spindle and is dimensioned on the other end to engage a pallet. To transfer a pallet from the workpiece storage support to the worktable or vice versa, the pallet transfer bar is clamped in the spindle, the worktable and spindle are moved along the X, Y and Z axes to align the pallet guideways and to engage the pallet transfer bar with the pallet, and the spindle is then moved in the appropriate direction along the Z axis to pull the pallet onto the worktable or push it off the worktable.

9 Claims, 9 Drawing Figures

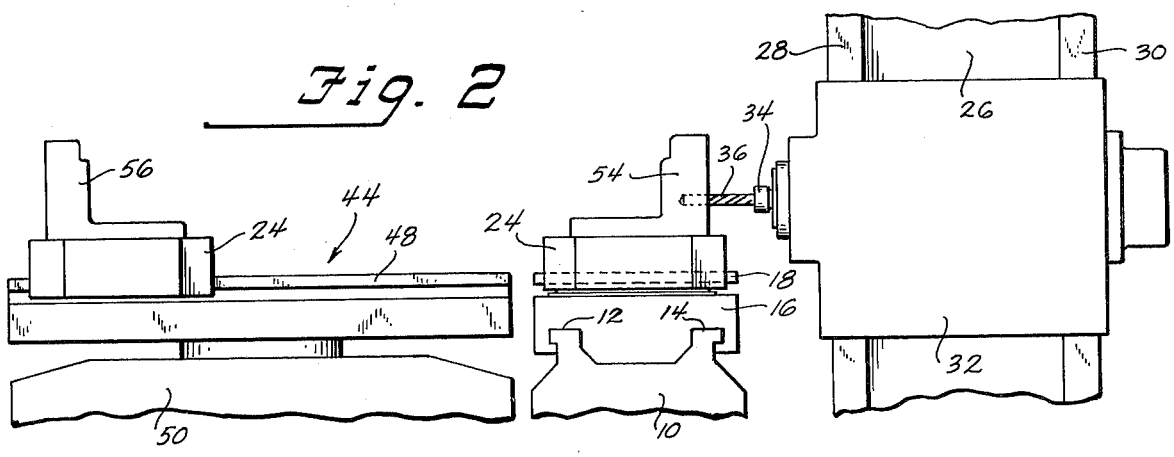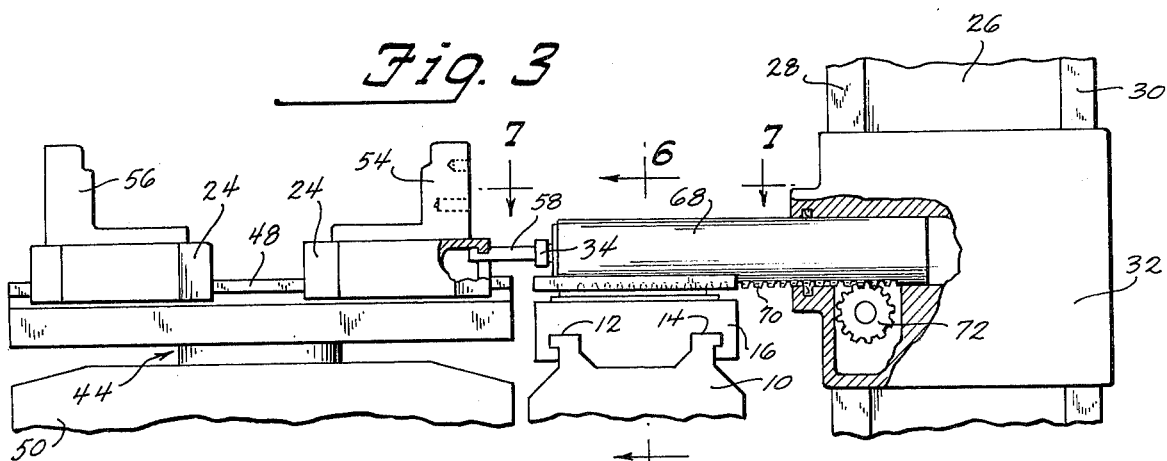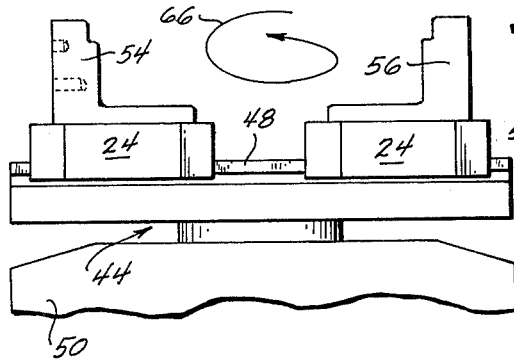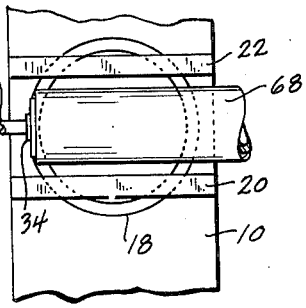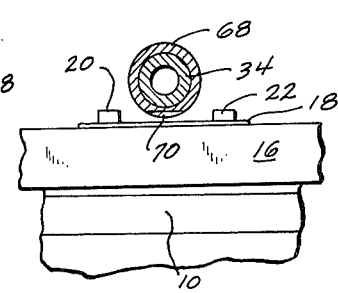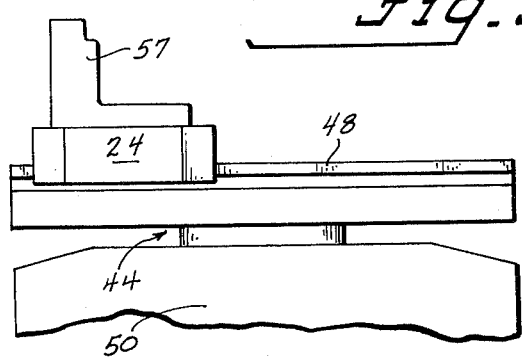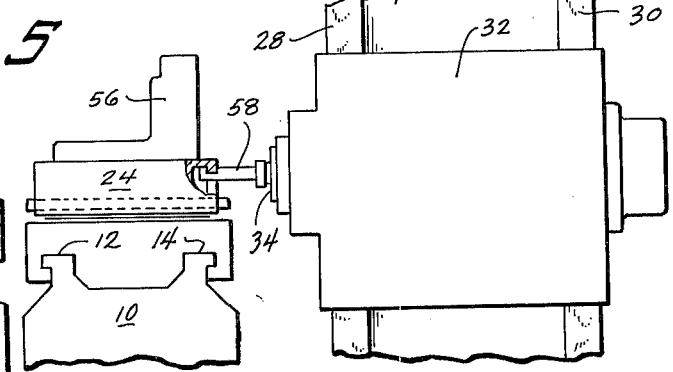

WORKPIECE CHANGER MECHANISM FOR A MACHINE TOOL

BACKGROUND OF THE INVENTION

This invention relates to a workpiece changer for automatically placing a workpiece on the worktable of a machine tool and for replacing the workpiece with another workpiece when machining operations on the first workpiece are completed.

An example of a prior art workpiece changer is disclosed in U.S. Pat. No. 3,825,245 which was issued on July 23, 1974, for a "Workpiece Changer Mechanism for a Machine Tool." This workpiece changer includes a workpiece storage support which is rotatably mounted on a frame at one end of the worktable X axis ways and has guideways for slideably receiving a pallet carrying a workpiece, the guideways being alignable with similar guideways on the worktable so that a pallet can be slid along the X axis from the workpiece storage support to the worktable and vice versa. The workpiece storage support is long enough to hold two pallets at the same time and can be rotated by 180° to interchage the position of the two pallets with respect to the worktable. The rotatable portion of the workpiece storage support includes a pair of hydraulic rams with separate hydraulic control systems which are each engageable with a corresponding pallet at opposite ends of the workpiece storage support to slide the pallet along the X axis from the workpiece storage support to the worktable or vice versa. The hydraulic rams and their hydraulic control systems are shown in FIGS. 9-12 of the above-noted patent.

SUMMARY OF THE INVENTION

The principal object of this invention is to provide a workpiece changer which performs the same function as the above-described prior art workpiece changer but which is significantly simpler in structure and lower in cost. In the novel workpiece changer of this invention, the above-described prior art hydraulic rams and their hydraulic control systems are eliminated by positioning the workpiece storage support on the side of the worktable opposite the spindle and by providing a transfer bar which is dimensioned at one end to fit in the spindle and is dimensioned at the other end to engage a pallet on the worktable or workpiece storage support. After the pallet has been engaged by the transfer bar, it can be slid from the worktable to the workpiece storage support, or vice versa, by moving the spindle in the appropriate direction along the Z axis. The machine tool preferably but not necessarily includes an automatic tool changer with a tool magazine holding a plurality of tools, and the transfer bar is preferably but not necessarily stored in the tool magazine between uses and is inserted into and removed from the spindle by the automatic tool changer.

BRIEF DESCRIPTION OF THE DRAWINGS

FIG. 2 is a fragmentary side elevation view showing a pallet carrying a workpiece mounted on the machining center worktable with the workpiece being drilled;

FIG. 3 is a fragmentary side elevation view similar to FIG. 2 showing the pallet carrying the drilled workpiece moved from the worktable to the adjacent end of the workpiece storage support;

FIG. 4 shows the workpiece storage support rotated through 180° to interchange the position of the pallet carrying the drilled workpiece and a pallet carrying an undrilled workpiece;

FIG. 5 is a fragmentary side elevation view similar to FIG. 2 showing the pallet carrying the undrilled workpiece moved from the workpiece storage support to the worktable;

FIG. 6 is a fragmentary cross-sectional view taken on the line 6—6 of FIG. 3;

FIG. 7 is a fragmentary plan view taken on the line 7—7 of FIG. 3;

DESCRIPTION OF THE PREFERRED EMBODIMENTS

Figure 1:
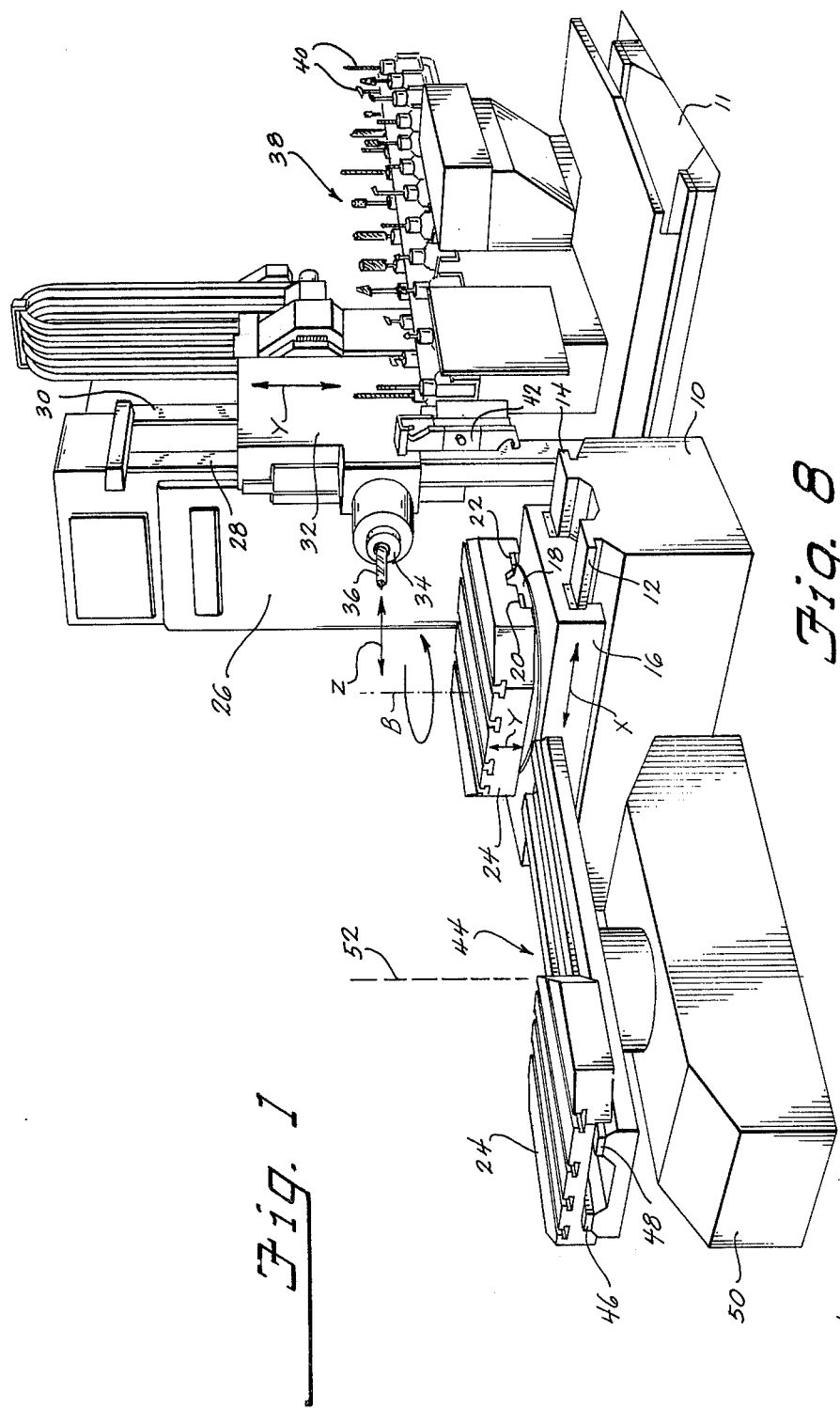
FIG. 1 is a perspective view of an embodiment of the invention utilized in combination with a horizontal machining center having an automatic tool changer.

FIG. 1 is a perspective view of an embodiment of the invention utilized in combination with a horizontal machining center which includes a first horizontal bed 10 supporting a pair of horizontal X axis ways 12 and 14. A worktable base 16 having the usual complementary ways is slideably mounted on ways 12 and 14 in the convention manner for movement along the X axis. An indexable worktable 18 is rotatably mounted on worktable base 16 in the conventional manner for rotation about a vertical B axis perpendicular to the X axis. Worktable 18 has a pair of horizontal pallet guideways 20 and 22 which are dimensioned to slideably receive a conventional workpiece holder pallet 24. Worktable 18 includes conventional pallet clamp means (not shown) for clamping pallet 24 thereto while work is being performed on a workpiece (not shown) clamped on pallet 24. Worktable 18 can be selectively indexed in the conventional manner for 360° around the B axis carrying pallet 24 with it.

In addition to horizontal bed 10 a second bed 11 is provided which extends in a transverse direction to support rearwardly extending transverse Z axis ways (not shown) disposed to slideably support a vertically upstanding column 26 for power driven movement along a Z axis perpendicular to both the X and Y axes. To provide movement along the Y axis, vertical column 26 is provided with the usual parallel, spaced, upstanding Y axis ways 28 and 30.

A spindle head 32 is slideably mounted in the conventional manner on Y axis ways 28 and 30 for movement along the Y axis, and a conventional spindle 34 is journalled with spindle head 32 for rotation about the Z axis. Spindle 34 is adapted to receive standard tools such as drill 36 and to clamp the tools to the rotary portion thereof to perform work on a workpiece (not shown) clamped to pallet 24. The machining center includes the conventional motors, linkages, and controls (not shown) for selectively rotating spindle 34, moving spindle head 32 along the Y axis, moving column 26 along the Z axis, moving worktable support 16 along the X axis, extending and retracting spindle 34 from spindle head 32, and indexing worktable 18.

The machining center preferably but not necessarily includes an automatic tool changer with a tool magazine 38 containing a plurality of tools 40 and an automatic tool changer arm 42 which is operable to interchange the tool 36 in spindle 34 with any selected tool in tool magazine 38. The usual controls (not shown) are provided for controlling the operation of the automatic tool changer. A detailed description of this type of automatic tool changer can be found in U.S. Pat. No. 3,587,873, which was issued on June 28, 1971, for a "Tool Change Mechanism for a Machine Tool."

A workpiece storage support 44 carrying horizontal pallet guideways 46 and 48 is rotatably mounted on a stationary frame or bed 50 for rotation about a vertical axis 52. Ways 46 and 48 have the same spacing and dimensions as the ways 20 and 22 on worktable 18 and are mounted at the same height and in position to be aligned therewith along the Z axis so that pallet 24 can be slid along the Z axis from ways 20 and 22 onto ways 46 and 48 and vice versa when worktable 18 is indexed 90° counterclockwise from the position shown in FIG. 1. The end of ways 46 and 48 adjacent to worktable 18 are close enough to permit smooth transfer of pallet 24 from worktable 18 to workpiece storage support 44 or vice versa.

Ways 46 and 48 on workpiece storage support 44 are long enough to simultaneously hold two pallets 24 as shown in FIGS. 3 and 4. However, during the machining operation, the pallet 24 carrying the workpiece 54 to be machined (see FIG. 2) is clamped on worktable 18 while the pallet 24 carrying the next workpiece 56 to be machined is located on the end of workpiece storage support 14 remote from worktable 18, the end of workpiece storage support 14 adjacent to worktable 18 being empty to receive the pallet 24 thereon when the machining operation is completed. Workpieces 54 and 56 are clamped to their respective pallets 24 by conventional clamp means (not shown).

The operation of this embodiment of the invention will be described starting with the arrangement of elements shown in FIG. 2 where workpiece 54 is being drilled and an identical undrilled workpiece 56 is mounted on the remote end of workpiece storage support 44 in position to replace workpiece 54 when the drilling and other machining operations thereon are completed. When the machining operations are completed, the drill 36 in spindle 34 is removed and replaced by a pallet transfer bar 58 (FIGS. 3, 8 and 9) which is dimensioned at one end to fit in spindle 34 as shown in FIG. 3 and is dimensioned at the other end to engage pallet 24 as shown in FIGS. 3 and 9. Each of the pallets 24 have an opening 60 (FIGS. 8 and 9) on the side facing spindle 34 when pallet 24 is in position to be transferred with a downwardly extending lip 62 (FIG. 8) above opening 60. In this particular example, pallet transfer bar 58 is notched at 64 (FIG. 8) to engage lip 62 as shown in FIGS. 3 and 9.

In this particular embodiment, pallet transfer bar 58 is stored in tool magazine 38 and is inserted into spindle 34 by the automatic tool changer which includes tool changer arm 42 and its associated control elements. This, however, is not an essential feature of this invention since pallet transfer bar 58 can be manually inserted into spindle 34 in embodiments which do not include an automatic tool changer.

Figure 8:
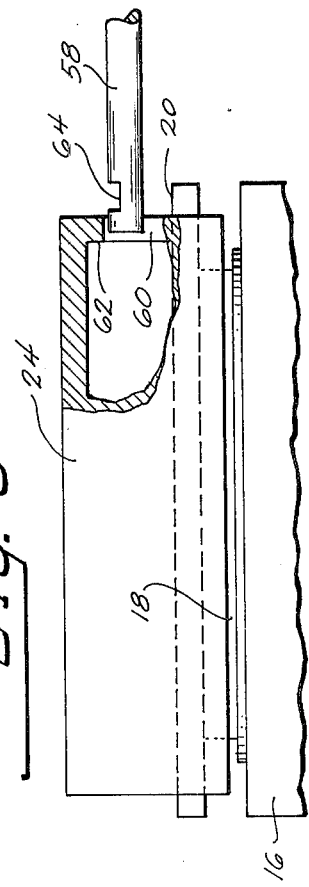
FIG. 8 is a fragmentary side elevation view, partially cut away, showing the free end of the pallet transfer bar adjacent to a pallet on the worktable.
Figure 9:
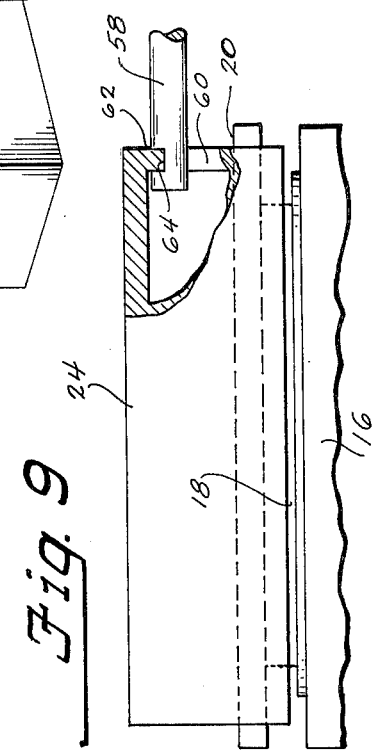
FIG. 9 is a fragmentary side elevation view similar to FIG. 8 showing a notch in the free end of the pallet transfer bar engaged with a lip on the pallet.

After pallet transfer bar 58 is clamped in spindle 34, spindle head 32 is moved along the Y axis to align pallet transfer bar 58 with the opening 60 in the pallet 24 on worktable 18 as shown in FIG. 8. At the same time, or previously before or during the tool change, worktable 18 is indexed about its B axis to align the worktable pallet guideways 20 and 22 with the corresponding workpiece storage support pallet guideways 46 and 48. This places the pallet 24 carrying the machined workpiece 54 in position to be slid from worktable 18 to the empty end of workpiece storage support 44 and moves opening 60 to a position opposite spindle 34 where it is accessible to pallet transfer bar 58.

When pallet transfer bar 58 is aligned with opening 60, spindle 34 is moved forward along the Z axis until the notch 64 in pallet transfer bar 58 is under the lip 62 in the pallet 24 on worktable 18. Spindle head 32 is then moved upwardly along the Y axis to engage notch 64 with lip 62 as shown in FIGS. 3 and 9.

Spindle 34 is then moved forward along the Z axis as shown in FIG. 3 to push the pallet 24 carrying machined workpiece 54 off of worktable 18 and onto the empty end of workpiece storage support 44. Spindle 34 is then moved downward along the Y axis to disengage notch 64 from lip 62 and is then moved backward along the Z axis to provide room to index workpiece storage support 44.

Workpiece storage support 44 is then indexed through 180° as indicated by the arrow 66 in FIG. 4 to interchange the pallet 24 carrying machined workpiece 54 with the pallet 24 carrying the unmachined workpiece 56. Spindle 34 is then moved to engage pallet transfer bar 58 with the latter pallet and pull it onto worktable 18 as shown in FIG. 5. (This is also the way in which workpiece 54 was initially loaded onto worktable 18). Spindle 34 is then moved to disengage pallet transfer bar 58 from pallet 24, and pallet transfer bar 58 is then removed from spindle 34 and replaced by a machining tool. At the same time, or later, the pallet 24 carrying the machined workpiece 54 is removed and replaced by a pallet 24 carrying an unmachined workpiece 57 (FIG. 5).

In this particular example, the above-described movement of spindle 34 along the Z axis to push pallet 24 off of worktable 18 or pull it onto worktable 18 is performed by a rack and pinion drive as illustrated in FIGS. 3, 6, and 7. As best shown in FIG. 6, spindle 34 is journalled within a quill 68 which is slideably mounted in spindle head 32 for movement along the Z axis. A rack 70 is formed in the bottom of quill 68 and is engaged by a pinion 72 which is driven by conventional means (not shown) to selectively extend or retract quill 68 and spindle 34. Quill 68 and the rack and pinion drive therefor are normally a part of the illustrated machining center but have not heretofore been used for the purpose of transferring pallets onto or off of worktable 18. In accordance with this invention, the pallet transferring function has been added to quill 68 and its drive mechanism, thereby eliminating the separate hydraulic rams and their hydraulic control systems that were previously used to perform the pallet transferring function. This improvement is made possible by changing the position of the workpiece storage support 44 from the end of the X axis ways 12 and 14 to the center of the X axis ways 12 and 14 opposite spindle 34 and by providing the pallet transfer bar 58 which enables spindle 34 to pull pallets 24 onto worktable 18 or push them off worktable 18. It should also be noted that the pallet transfer operation is faster with the method and apparatus of this invention because the worktable 18 no longer has to be moved to the end of the X axis ways 12 and 14 to effect the pallet transfer but is rather positioned opposite spindle 34 during the pallet transfer operation.

Although the illustrative embodiment of the invention has been described in considerable detail for the purpose of fully disclosing a practical operative structure incorporating the invention, it is to be understood that the particular apparatus shown and described is intended to be illustrative only and that the various novel features of the invention may be incorporated in other structural forms without departing from the spirit and scope of the invention as defined in the subjoined claims.

The principles of this invention having now been fully explained in connection with the foregoing, I hereby claim as my invention:

1. A workpiece changer for a machine tool having a first and second beds;
   a worktable mounted on said first;
   a spindle rotatably mounted on said second bed opposite said worktable for rotation about a first axis and slideably mounted on said second bed for movement along said first axis toward and away from said worktable; and
   means for moving said spindle along said first axis, said workpiece changer comprising:
   a workpiece storage support mounted adjacent to said worktable on the side thereof opposite said spindle;
   guide means on said worktable for slideably receiving a workpiece holder;
   guide means on said workpiece storage support for slideably receiving a workpiece holder, said guide means on said worktable and on said workpiece storage support being dimensioned and positioned to permit a workpiece holder to be slid from said workpiece storage support to said worktable and from said worktable to said workpiece storage support along said first axis; and
   a transfer bar dimensioned at one end to be clamped in said spindle and dimensioned at the other end to engage said workpiece holder for causing said workpiece holder to slide along said guide means when said transfer bar is clamped in said spindle and engaged with said workpiece holder and said spindle is moved along said first axis toward or away from said worktable.

2. A workpiece changer according to claim 1 wherein said workpiece storage support is rotatably mounted on a frame for rotation about a second axis transverse to said first axis, and wherein said guide means on said workpiece storage support is long enough to hold two workpiece holders at the same time.

3. A workpiece changer according to claim 1 wherein said worktable is rotatably mounted on said first bed for rotation around a second axis transverse to said first axis, said guide means on said worktable being alignable with said guide means on said workpiece storage support in one rotary position of said worktable.

4. A workpiece changer according to claim 1 wherein said machine tool includes an automatic tool changer with a tool magazine for storing a plurality of tools and with means for automatically removing selected tools from said tool magazine and inserting them into said spindle, and for removing tools from said spindle and returning them to said tool magazine, said transfer bar being stored in said tool magazine between uses and being inserted into and removed from said spindle by said automatic tool changer means.

5. A workpiece changer according to claim 1 wherein said workpiece holder has a lip on the side thereof opposite said spindle and wherein one end of said transfer bar is notched to engage said lip.

6. A method of transferring workpiece holders onto and off of a worktable on a machine tool having a spindle which is moveable along a first axis toward and away from said worktable, comprising the steps of:
   (A) providing a transfer bar which is dimensioned on one end to fit in said spindle and is dimensioned on the other end to engage said workpiece holder;
   (B) clamping said transfer bar in said spindle;
   (C) positioning said spindle to engage said other end of said transfer bar with said workpiece holder;
   (D) moving said spindle along said first axis toward or away from said worktable to pull said workpiece holder onto said worktable or to push said workpiece holder off of said worktable;
   (E) positioning said spindle to disengage the free end of said transfer bar from said workpiece holder; and
   (F) removing said transfer bar from said spindle.

7. The method of claim 6 and further comprising the step of:
   (G) storing said transfer bar in a tool magazine adjacent to said machine tool.

8. A workpiece changer for a machine tool having a frame;
   a worktable mounted on said frame for receiving workpieces to be machined;
   a rotary spindle journalled in said frame and movable axially in a rectilinear path of travel, said spindle being adapted to receive cutting tools and rotate such tools for operating on the workpieces;
   said workpiece changer comprising a workpiece storage support mounted adjacent to said worktable;
   guide means disposed parallel to the axis of said spindle for guiding the workpieces in a path of travel between said storage support and said worktable;
   coupling means operable to couple said spindle to the workpieces selectively; and
   power means connected for moving said spindle axially along its rectilinear path of travel so that when the spindle is coupled to a workpiece it may be moved axially to move such workpiece along said guide means for transferring the workpieces between said storage support and said worktable.

9. A method of transferring workpieces between a workpiece storage support and a worktable on a machine tool having a rotary spindle that is also movable in a rectilinear path of travel comprising,
   placing the workpieces to be machined on a workpiece storage support;
   coupling a workpiece on said storage support to said spindle;
   moving said spindle in its rectilinear path of travel to move said workpiece from said storage support into operating position on said worktable for performing a machining operation on the workpiece;
   uncoupling the spindle from the workpiece to enable a machining operation to be performed on the workpiece;
   coupling the spindle to the completed workpiece after the machining operation has been completed;
   moving the spindle in its rectilinear path of travel for transferring the completed workpiece off of said worktable and onto said storage support; and
   uncoupling the spindle from the workpiece on said storage support.

* * * * *